Feb. 21, 1939.  G. VAN YAHRES  2,147,865
TREE CAVITY FILLING AND FILLER BLOCK THEREFOR
Filed Feb. 6, 1937
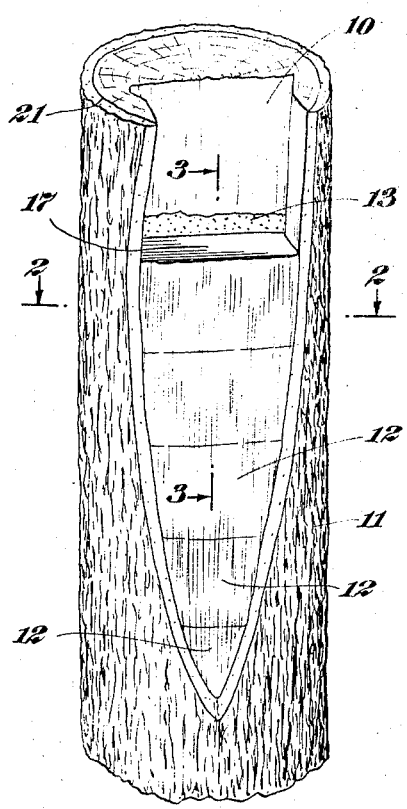
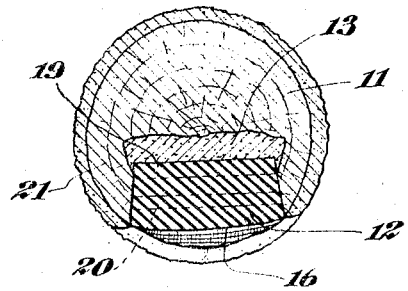
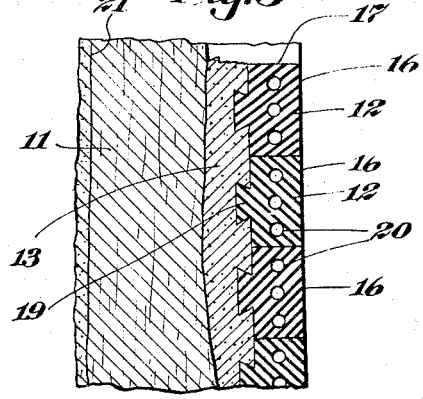
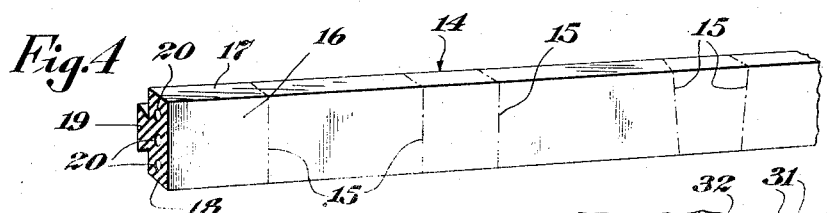
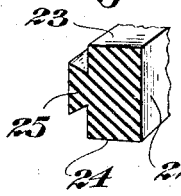
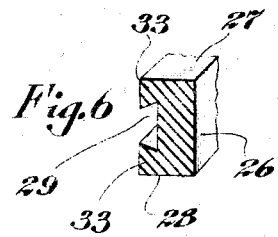
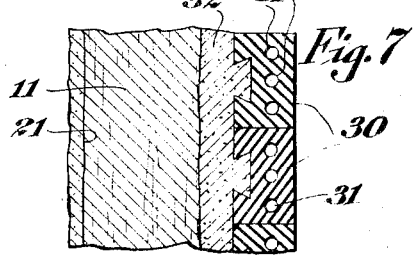
INVENTOR,
George Van Yahres,
BY
ATTORNEY.

Patented Feb. 21, 1939

2,147,865

UNITED STATES PATENT OFFICE 2,147,865

TREE CAVITY FILLING AND FILLER BLOCK THEREFOR

George Van Yahres, Westbury, N. Y.

Application February 6, 1937, Serial No. 124,428

4 Claims. (Cl. 47—8)

My present invention relates generally to tree surgery, and has particular reference to an improved tree cavity filling.

A general object of the invention is to provide a tree cavity filling which may be more easily and more efficiently applied than those which have been heretofore used; which is more firmly and permanently anchored in position; and which is composed of a material having many outstanding advantages as compared with tree cavity fillings of conventional character.

In my earlier Patent Number 1,624,820, issued April 12, 1927, I have discloesd a filling consisting in part of filler blocks composed of cork. While a filling of that character is far preferable in many respects to ordinary cement and to other materials theretofore employed for this purpose, it has been found that the use of cork is in many respects not entirely satisfactory. For example, cork blocks usually require a preliminary softening treatment; they are not thoroughly pliable; they are susceptible to cracking and relatively hard to cut and whittle to shape; and the inherent porous character of cork renders it susceptible to fungi and to insect and bird attack unless special precautions are taken.

My present invention is predicated upon the discovery that vulcanized soft rubber is admirably adapted to serve as a tree cavity filling. Among its advantages are the following.

It is completely non-porous and homogeneous and hence not only completely waterproof, but thoroughly impervious to the deleterious effects of insects, birds, and fungi. It has an inherent pliability, ductility, and elasticity which permits it to adapt itself more completely to the tree cavity and permits it to give and yield more in harmony with the swaying of the tree and the natural expansion and contraction of the tree during the continued life processes of the tree. It is not only less expensive than cork, but it can be furnished in uniform cross-sectional sizes; it is stronger; and it is easier to handle, cut, and whittle to the particular shapes that are required. It lends itself readily to inherent pigmentation, so that it may be colored to match the particular tree in which it is used. Moreover, it is not only chemically unreactive and harmless toward the material of the tree, but its sulphur content is an efficient insect-repellant and fungicide.

It is thus a feature of my invention to employ, as a tree cavity filling, a series of filler blocks composed of vulcanized soft rubber. Preferably, the blocks are formed by cutting them to the required sizes from a rod or length having the proper uniform cross-section.

Another feature of my invention lies in providing each block with at least one rearward undercut projection, integral with the block, whereby a series of superposed blocks may be efficiently anchored in position by the employment, as part of the cavity filling, of a poured binding medium filling the rear of the cavity and embedding the block projections therein.

In a modified form of the invention, each block has on its rear face a channel of undercut character whereby the poured binding medium may enter into the channel and thereby serve to anchor a series of superposed filler blocks.

I achieve the foregoing objects, and such other objects as may hereinafter appear or be pointed out, in the manner illustratively exemplified in the accompanying drawing, wherein:

Figure 1 is a perspective view of a portion of a tree showing a cavity partially filled with a cavity filling of the present character;

Figure 2 is a cross-sectional view taken substantially along the line 2—2 of Figure 1;

Figure 3 is a cross-sectional view taken substantially along the line 3—3 of Figure 1;

Figure 4 is a perspective view of a portion of a rod or length of vulcanized soft rubber from which the filler blocks of the present invention may be formed;

Figure 5 is a fragmentary perspective view of a modified type of block;

Figure 6 is a fragmentary perspective view of another modification; and

Figure 7 is a cross-sectional view similar to Figure 3 and showing the employment of a modified filler block similar to that of Figure 6.

The cavity 10 of a tree 11 is first treated in the regular way to clean it out thoroughly, and to impart to it the proper shape. A series of filler blocks 12, composed of vulcanized soft rubber, are inserted into the outer portion of the cavity in superposed stacked relationship. Each of these blocks is preliminarily cut and/or otherwise formed and if necessary whittled to a shape and size suitable for the particular cavity portion which it is to occupy, the most economical and satisfactory method of shaping the blocks being a matter of choice according to known practices of the rubber art and the circumstances of each case, such as field preparation or factory preparation of the blocks or the strips from which they are cut. In performing this step, each block is purposely oversized by a slight amount, so that it may be wedged into position in compressed condition, thereby causing it to brace itself firmly by virtue of its natural elasticity. As the insertion of the filler blocks proceeds, a mass of binding medium 13 is poured or otherwise introduced into the rear portion of the cavity. If desired, each block may be temporarily or permanently held in more firm association with the adjacent block by means of nails or spikes (not shown).

It will be understood that the blocks are not necessarily inserted in sequence from the lowest to the uppermost, and that in many cases it may be desirable to superpose some of the blocks from the bottom of the cavity toward the middle, and some other blocks from the top portion of the cavity downwards, so that the cavity filling is finally completed by wedging into position an intermediate block.

Some of the particuar features of my invention are most clearly disclosed in Figures 3 and 4.

In Figure 4, I have illustrated a rod or length 14 of vulcanized soft rubber from which the filler blocks may be successively cut to the desired lengths by severing the rod 14 transversely along lines such as those indicated by the reference numeral 15. It will be observed that the rod 14 is of generally rectangular cross-section, having a front face 16 of substantially plane character, and top and bottom faces 17 and 18 substantially parallel to each other. In the embodiment illustrated in Figure 4, the rod 14 is provided at the rear with an integral projection 19 which is in the form of a continuous longitudinal rib. In accordance with my invention, this rib is of an undercut character, i. e., its width increases rearwardly. The dovetail cross-section illustrated in Figures 3 and 4 embodies these characteristics.

In the embodiment of Figure 4, the rod 14 is also provided with a series of longitudinal bores 20 which extend through the rod in a direction substantially parallel to the front face 16 and the top and bottom faces 17 and 18.

The uniform cross-section of the rod 14 permits individual filler blocks to be cut therefrom, and permits such blocks to be superposed or stacked with relation to one another, the bottom face of one block snugly contacting and engaging with the upper face of the block beneath, and the upper face of each block being similarly adapted to abut and engage snugly with the lower face of the block above.

The rearward undercut projections, arranged in superposed relationship as shown most clearly in Figure 3, are, in the completed tree filling, embedded within the binding medium 13, whereby the superposed blocks are firmly anchored in position.

It will be understood that the blocks, when inserted, are carefully arranged so that their outer faces do not project beyond the cambium layer 21 (see Figure 2), whereby the tree has an opportunity, in course of time, to heal the wound and ultimately grow over and completely conceal the filling.

The longitudinal bores 20 are preferably employed because they provide for enhanced compressibility and distortion of the filler blocks during the subsequent swaying and growth of the tree.

In Figure 5, I have illustrated a modification in which the bores 20 have been omitted, each filler block in this case being, as before, of general rectangular cross-section with a plane front face 22, top and bottom faces 23 and 24, and a medial undercut rib 25 projecting rearwardly.

In Figure 6, I have illustrated a modified construction in which the filler block has a front face 26, top and bottom faces 27 and 28, and a channel 29 in its rear face. This channel is of undercut cross-section, i. e., its width decreases rearwardly. The dovetail cross-section illustrated in Figures 6 and 7 embodies these characteristics.

The use of blocks of the general shape of Figure 6 in a tree filling is illustrated most clearly in Figure 7; and in the latter figure I have designated the blocks by the reference numeral 30. The blocks 30 are in every respect similar to the blocks shown in Figure 6, except that I have again shown the possibility of providing longitudinal bores 31.

A binding medium 32 is disposed within the rear portion of the cavity, and enters also into the channels in the rear faces of the blocks 30, thereby anchoring the blocks firmly in position.

While I have described the block of Figure 6 as having a channel 29 in its rear face, it will be apparent that this block may also be defined as having two rearward projections or ribs 33, each of which is of undercut character.

The modified blocks of Figures 5, 6, and 7 will be, as before, cut to the required lengths from an integral rod of vulcanized soft rubber having the desired cross-section.

A tree filling of the present character is thoroughly impervious to insect attack not only because of the non-porous character of the vulcanized rubber blocks, but also because of the repellant effect of the sulphur content. The nature of vulcanized soft rubber makes it also impervious to the attack of woodpeckers or other birds, and the non-porous character of the rubber makes it immune to the deleterious effects of fungi spores or other injurious bacteria or growths.

It need hardly be pointed out that the vulcanized rubber blocks provide a completely waterproof seal for the cavity, and that the inherent pliability and elasticity of the material makes it admirably qualified to yield and move with the swaying of the tree and with the other stresses which the continued growth of the tree may induce. It should be mentioned that the rubber blocks fit more tightly than blocks made of cork or other material; that they do not shrink; and that they fit snugly together without the requirement for any extraneous joints or other braces.

It is the ability of the rubber to be readily contoured by methods well known in the rubber art which permits the rearward projections to be integrally formed thereon, and the bores to be provided therethrough, where such bores are deemed desirable. Furthermore, it is inherent in the nature of vulcanized soft rubber that it may be shaped into the lengths or rods contemplated by the present invention, whereby all the blocks of the tree filling are uniform except in length. This contributes toward economy of manufacture and handling, and produces a tree filling of unusually attractive and efficient character.

One of the outstanding advantages of vulcanized soft rubber is that any desired pigmentation may be imparted thereto during its manufacture. In this way, it is not necessary to paint the present filling in order to effect a color match with the tree in which it is used, because by properly pigmentating the rubber during its manufacture the matching effect may be made to be inherent in the filling itself.

A further advantage of the rubber is that the filling may be subsequently treated by contouring the exposed surface with a knife, a stiff brush, or with other tools, so as to impart any desired surface contour to the filling. For example, by making a series of longitudinal grooves in the filling an appearance similar to bark may be simulated.

In general, a filling of the present character has proven to be far superior to any which have hitherto been used or attempted, the present filling being completely weather-proof and permanent, and admirably suited to the continued growth and ultimate healing of the tree.

The binding medium which I have referred to in the claims as being "poured" is preferably a mixture of asbestos and cement, but any other suitable medium may be employed. The term "poured" is not intended to connote that this binding medium is necessarily in a completely liquid state when it is introduced. The material may, under certain circumstances, be of plastic character, and the essential quality lies in the fact that it is a homogeneous mass which ultimately hardens, as distinguished from the filler blocks which are discrete and solid at the outset.

It will also be understood that the feature of my invention relating to the rearward projections on the blocks, or the rear channels in the blocks, need not necessarily be employed in connection with filler blocks of vulcanized soft rubber, although the nature of the latter material is such that this interlocking feature of the present filling is readily and feasibly employed where the filler blocks are of vulcanized soft rubber.

Where wide cavities are encountered, it is sometimes desirable to reinforce the filling to prevent bulging of the rubber faces before the binding medium has had a chance to "set". This may be accomplished by interposing pieces of wire mesh between the blocks, each piece extending rearwardly and being nailed or otherwise secured to the rear wall of the cavity. The forward portion of each piece of wire mesh is nailed or otherwise secured to the blocks between which it is sandwiched, and preferably terminates behind the front face of the filling so that it is completely concealed from view. The yieldability of the rubber blocks permits such wire mesh reinforcements to be snugly sandwiched between the blocks without in the least impairing the tightness of the joints along the outer face of the filling.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

An advantage of the invention is that the strips can be economically manufactured by processes well known in the rubber art, as by the extrusion process, for example, with the under-cut ribs and the longitudinal holes formed in the initial forming of the strip.

In the appended claims the words "a substance having the pertinent characteristics of vulcanized soft rubber" are to be understood as meaning a substance at least approximating vulcanized soft rubber in all of the following characteristics: resilient deformability, toughness, imperviousness to water, and resistance to the deteriorating effects of plant and animal organisms and exposure to the weather.

Having thus described my invention, and illustrated its use, what I claim as new and desire to secure by Letters Patent is—

1. A tree cavity filling comprising a resiliently deformable structure substantially filling at least the mouth of the cavity and held in a deformed and permanently strained condition by its resilient pressure against the surface defining the cavity, said structure being composed at least chiefly of a substance having the pertinent characteristics of vulcanized soft rubber.

2. A tree cavity filling comprising a resiliently deformable dam substantially closing the mouth of the cavity and held in a deformed and permanently strained condition by its resilient pressure against the surface defining the cavity, said dam being composed at least chiefly of a substance having the pertinent characteristics of vulcanized soft rubber, and a mass of material substantially filling the cavity back of the dam.

3. A tree cavity filling comprising a resiliently deformable structure substantially filling at least the mouth of the cavity and held in a deformed and permanently strained condition by its resilient pressure against the surface defining the cavity, said structure being composed at least chiefly of blocks of a substance having the pertinent characteristics of vulcanized soft rubber.

4. A filler block for a tree cavity, said block being composed at least chiefly of a substance having the pertinent characteristics of vulcanized soft rubber and adapted to be held in a deformed and permanently strained condition by its resilient pressure against the surface defining the tree cavity.

GEORGE VAN YAHRES.